United States Patent
Igashira

(10) Patent No.: US 12,502,949 B2
(45) Date of Patent: Dec. 23, 2025

(54) VEHICLE

(71) Applicant: TOYOTA JIDOSHA KABUSHIKI KAISHA, Toyota (JP)

(72) Inventor: Kenji Igashira, Ikeda (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 332 days.

(21) Appl. No.: 18/143,881

(22) Filed: May 5, 2023

(65) Prior Publication Data

US 2023/0406091 A1 Dec. 21, 2023

(30) Foreign Application Priority Data

Jun. 15, 2022 (JP) ................................ 2022-096581

(51) Int. Cl.
| | | |
|---|---|---|
| *B60K 11/04* | (2006.01) | |
| *B60K 1/00* | (2006.01) | |
| *B62D 21/03* | (2006.01) | |

(52) U.S. Cl.
CPC ............... *B60K 11/04* (2013.01); *B60K 1/00* (2013.01); *B62D 21/03* (2013.01)

(58) Field of Classification Search
CPC .......... B60K 11/04; B60K 1/00; B62D 21/03; B62D 25/084; B62D 21/11; B62D 21/02; B62D 21/152
See application file for complete search history.

(56) References Cited

U.S. PATENT DOCUMENTS

| | | | | |
|---|---|---|---|---|
| 6,672,652 | B2 * | 1/2004 | Takeuchi | B62D 25/084 |
| | | | | 296/203.02 |
| 10,053,156 | B2 * | 8/2018 | Daigaku | B62D 21/155 |
| 10,322,751 | B2 * | 6/2019 | Kanasugi | B62D 29/008 |
| 2017/0113723 | A1 * | 4/2017 | Murata | B62D 21/152 |
| 2018/0105213 | A1 * | 4/2018 | Kagami | B62D 21/11 |
| 2019/0100065 | A1 | 4/2019 | Hata et al. | |
| 2022/0410974 | A1 * | 12/2022 | Eklund | B62D 21/03 |

(Continued)

FOREIGN PATENT DOCUMENTS

| | | | |
|---|---|---|---|
| JP | 2000264075 A | * | 9/2000 |
| JP | 2016078713 A | * | 5/2016 |
| JP | 2019-064362 A | | 4/2019 |

(Continued)

OTHER PUBLICATIONS

JP-2000264075-A English Translation (Year: 2000).*

(Continued)

*Primary Examiner* — Michael T. Walsh
(74) *Attorney, Agent, or Firm* — Dinsmore & Shohl LLP

(57) ABSTRACT

A vehicle includes a body and a suspension member attached to a lower portion of the body at a vehicle-front side. The suspension member includes: a pair of side rails extending in a front-rear direction of the vehicle; a front cross member that is disposed between the side rails and that extends in a vehicle-width direction; and a pair of connecting members that connects the front cross member and the side rails. Each of the connecting members has an upper plate, a lower plate, and a side plate. The upper plate is joined to an upper face of the side rail. The lower plate is joined to a lower face of the side rail. The lower plate and an upper face of the front cross member are joined together.

5 Claims, 3 Drawing Sheets

(56) References Cited

U.S. PATENT DOCUMENTS

2023/0094923 A1 *   3/2023   Hayakawa ............. B62D 25/20
                                                        296/187.08

FOREIGN PATENT DOCUMENTS

| JP | 2022040820 A * | 3/2022 | ........... B62D 25/084 |
| KR | 970002327 B1 * | 3/1997 | ........... B62D 25/084 |

OTHER PUBLICATIONS

JP-2022040820-A English Translation (Year: 2022).*
JP-2016078713-A English Translation (Year: 2016).*
KR-970002327-B1 English Translation (Year: 1997).*

* cited by examiner

VEHICLE

CROSS-REFERENCE TO RELATED APPLICATION

This application claims priority to Japanese Patent Application No. 2022-096581 filed on Jun. 15, 2022, incorporated herein by reference in its entirety.

BACKGROUND

1. Technical Field

The technology disclosed in the present specification relates to a vehicle.

2. Description of Related Art

Japanese Unexamined Patent Application Publication No. 2019-64362 (JP 2019-64362 A) discloses a suspension member including a pair of side rails extending in a vehicle front-rear direction and a front cross member disposed between the side rails and extending in a vehicle-width direction. The suspension member is a vehicle structure that supports a suspension system (a suspension arm in particular) and is attached to a body of a vehicle from below, at a front portion of the vehicle.

SUMMARY

In some embodiments, depending on the layout of various types of parts in a front compartment, there are cases in which the front cross member may be situated on a downward side of the side rails. However, situating the front cross member on the downward side from the side rails may lead to functions as a reinforcing member that connects the side rails deteriorating, and rigidity of the suspension member may deteriorate.

A vehicle according to a first aspect of the present disclosure includes a body and a suspension member that is attached to a lower portion of the body at a vehicle-front side. The suspension member includes a pair of side rails extending in a front-rear direction of the vehicle. The suspension member includes a front cross member disposed between the side rails, and extending in a vehicle-width direction. The suspension member includes a pair of connecting members that connects the front cross member and the side rails. Each of the connecting members includes an upper plate, a lower plate, and a side plate. The upper plate is joined to an upper face of the side rail and projects from the side rail inward in the vehicle-width direction. The lower plate is joined to a lower face of the side rail and projects from the side rail inward in the vehicle-width direction. The side plate connects the upper plate and the lower plate that project from the side rail. The lower plate and an upper face of the front cross member are joined together.

The form of "joining" is not limited in particular, and may be performed by welding or fastening by bolts, for example. Also, "joining" is a concept including forms in which other parts, such as spacers, are interposed between the parts being joined.

In the vehicle described above, the lower plate of the connecting member is connected to the lower face of the side rail. Also, an upper face of the front cross member is joined to the lower plate of the connecting member. This enables the front cross member to be situated on the downward side from the side rails. The connecting member has a closed cross-sectional structure formed by the upper plate, the lower plate, and the side plate. The front cross member can be connected to the side rails via the closed cross-sectional structure, and accordingly sufficient rigidity can be ensured at the connecting portion. The position of the front cross member can be lowered relative to the side rails, while maintaining the function of the front cross member as a reinforcing member.

A bracket may further be provided that projects forward in the vehicle from the front cross member and that is configured to be capable of supporting a radiator. The bracket may include a plate member that is distanced from the front cross member and faces the front cross member, and also extends in the vehicle-width direction. A region of presence of the plate member in the vehicle-width direction may overlap at least part of a region of presence of the connecting member in the vehicle-width direction. With this configuration, rigidity of the front cross member in the region where the connecting member is present can be increased by the plate member. Sufficient rigidity of the connecting portion can be ensured.

A flange may be further provided, disposed at a distal end of the side rail in a vehicle-forward direction. The flange may be connected to the bracket. With this structure, an annular structure (e.g., end-to-end connection in a circuit) can be formed by the side rail, the flange, the bracket, the front cross member, and the connecting member. This enables rigidity of the connecting portion to be increased.

The upper plate may include a first region situated above the side rail and a second region projecting from the side rail inward in the vehicle-width direction. A prime mover mount may be further provided, disposed across the first region and the second region. The prime mover supported by the prime mover mount is not limited in particular. The prime mover is a concept that includes an electric motor, a motor unit in which an electric motor and a control unit are integrated, an engine, and so forth. With this structure, the connecting member can also function as a mechanism for supporting the prime mover mount.

The prime mover mount may be fastened to the side rail along with the upper plate. With this structure, the connecting member and the side rail can be firmly fixed by fastening the prime mover mount.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Vehicle Structure

A vehicle 1 according to an embodiment will be described with reference to the drawings. "Front" in the coordinate system in FIG. 1 indicates a vehicle-forward direction. "Up" indicates a vehicle-upward direction. "Left" indicates left when viewing forward from a rearward side of the vehicle. The meanings of the axes in the coordinate system are the same in the following drawings as well. Note that the vehicle according to the present embodiment has a right-left symmetrical form, and accordingly, hereinafter only one side of the vehicle may be described in some cases.

Figure 1:
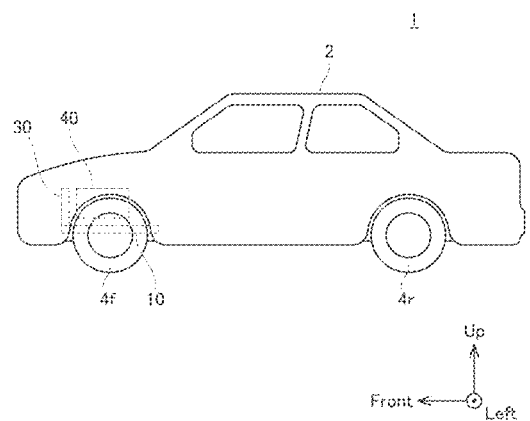
FIG. 1 is a side view illustrating an overview of a vehicle 1.

As illustrated in FIG. 1, the vehicle 1 includes a body 2 and a plurality of wheels 4f and 4r. A suspension member 10 is attached to a lower portion of the body 2, at a vehicle-front side. The suspension member 10 is a structure that primarily supports a suspension system (a suspension arm in particular). A radiator 30 and a motor unit 40 are attached to the suspension member 10. The motor unit 40 is a part in which a motor and a power control unit are integrated. The motor unit 40 drives at least one of the wheels 4f and 4r.

Structure of Suspension Member 10

Figure 2:
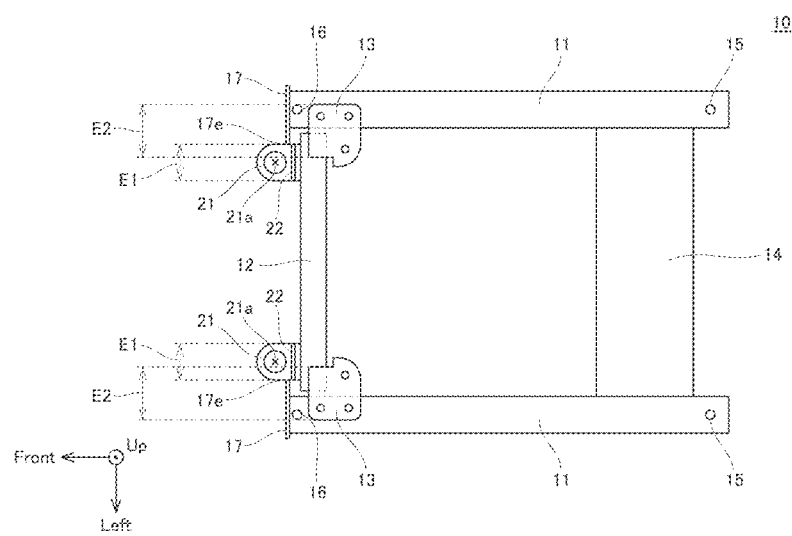
FIG. 2 is a top view of a suspension member 10.
Figure 3:
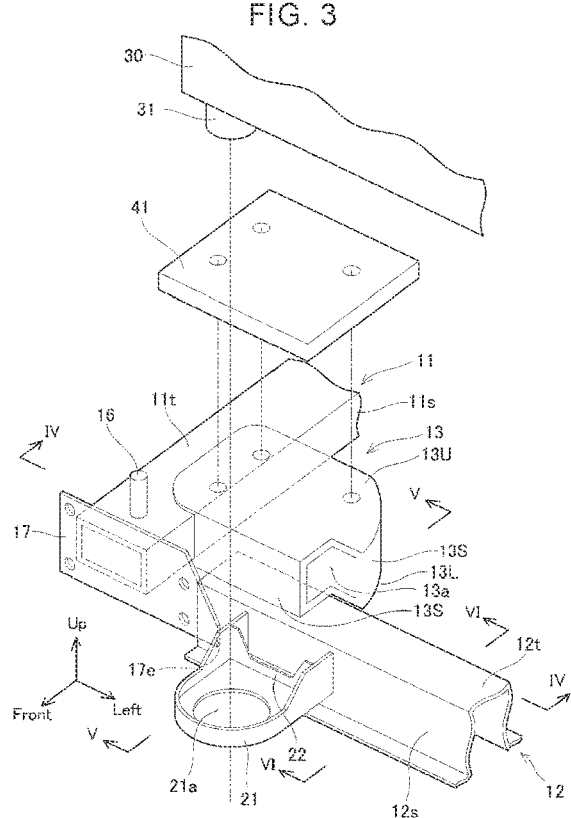
FIG. 3 is a disassembled perspective view of the suspension member 10 at a vehicle front-right-side portion.

FIG. 2 is a top view of the suspension member 10. FIG. 3 is a disassembled perspective view of the suspension member 10 at a vehicle front-right-side portion. The suspension member 10 includes a pair of side rails 11, a front cross member 12, a pair of connecting members 13, a rear cross member 14, a pair of fastening members 15 and 16, a pair of flanges 17, and a pair of brackets 21. The side rails 11 have shapes that are symmetrical with each other in a right-left direction, and each extend along a front-rear direction of the vehicle. The front cross member 12 extends in a width direction of the vehicle, between the side rails 11, at the front of the vehicle. The connecting members 13 connect the front cross member 12 and the side rails 11. The rear cross member 14 connects the side rails 11 in the width direction of the vehicle, at the rear of the vehicle. Note that specific shapes and structures of the side rails 11 and the front cross member 12 are not limited in particular.

The fastening member 15 is a member that fixes a rear portion of the suspension member 10 to the body 2. The fastening member 16 is a member that fixes a front portion of the suspension member 10 to a front side member (omitted from illustration). The suspension member 10 is fixed to a lower side of the body 2 in a suspended state by the fastening members 15 and 16.

Structure of Connecting Member 13

Figure 4:
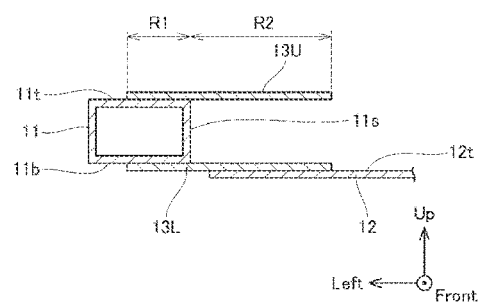
FIG. 4 is a schematic cross-sectional view taken along line IV-IV in FIG. 3.
Figure 5:
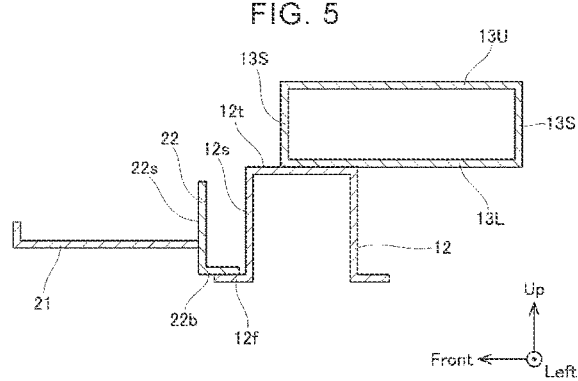
FIG. 5 is a schematic cross-sectional view taken along line V-V in FIG. 3.

FIG. 4 is a schematic cross-sectional view taken along line IV-IV in FIG. 3. FIG. 5 is a schematic cross-sectional view taken along line V-V in FIG. 3. As illustrated in FIGS. 3 to 5, the connecting member 13 includes an upper plate 13U, a lower plate 13L, and side plates 13S. The upper plate 13U is joined to an upper face 11t of the side rail 11 and projects from the side rail 11 inward in the vehicle-width direction. The lower plate 13L is joined to a lower face 11b of the side rail 11 and projects from the side rail 11 inward in the vehicle-width direction. The side plates 13S connect the upper plate 13U and the lower plate 13L that are projecting from the side rail 11. Also, the side plates 13S are joined to a side face 11s of the side rail 11 inward in the vehicle-width direction. Accordingly, the connecting member 13 has a closed cross-sectional structure formed by the upper plate 13U, the lower plate 13L, and the side plates 13S. The configuration is such that the upper plate 13U and the lower plate 13L sandwich the side rail 11 from above and below. Accordingly, strength of joining the side rail 11 and the connecting member 13 can be increased. An upper face 12t of the front cross member 12 is joined to a lower face of the lower plate 13L. Accordingly, the position of the front cross member 12 in the vehicle up-down direction can be situated on a downward side of the lower face 11b of the side rail 11.

As illustrated in FIG. 4, the upper plate 13U includes a first region R1 situated above the side rail 11 and a second region R2 projecting from the side rail 11 inward in the vehicle-width direction. Also, as illustrated in FIG. 3, a motor mount 41 is disposed on the upper plate 13U, across the first region R1 and the second region R2. The motor mount 41 is a member for fixing the motor unit 40 to the suspension member 10. Note that in FIG. 3, the motor mount 41 is illustrated as a simplified plate member. The motor mount 41 is fastened to the side rail along with the upper plate 13U by bolts or the like, which are omitted from illustration. Accordingly, the connecting member 13 and the side rail 11 can be firmly fixed by fastening the motor mount 41 to the side rail 11.

Note that various methods may be used to form the closed cross-sectional structure of the connecting member 13. The method may be forming by combining members obtained by bending steel plates, and by welding the members together. The closed cross-sectional structure may be an integrally-formed part, created by carving or a 3D printer.

The connecting member 13 also is provided with an opening 13a at which no side plate 13S is disposed. Providing the opening 13a facilitates each process such as welding, fastening, and so forth. Assembly workability can be improved while maintaining strength.

Structure of Bracket 21

The brackets 21 are members that are connected to a lower end of the radiator 30, and support the radiator 30 from below. The two brackets 21 are provided right-left symmetrically at the front portion of the suspension member 10. Each bracket 21 is fixed to the suspension member 10 and projects forward in the vehicle from the front cross member 12. Each bracket 21 has a hole 21a.

The radiator 30 is a thin, substantially cuboid component that extends along the vehicle-width direction and the vehicle up-down direction. As illustrated in FIG. 3, the radiator 30 has rubber bushes 31. The rubber bushes 31 are provided right-left symmetrically at a lower portion of the radiator 30. The positions of arranging the rubber bushes 31 correspond to the holes 21a of the brackets 21.

Each bracket 21 has a plate member 22. As illustrated in FIG. 5, the plate member 22 has an L-shaped cross section, and has a lower face 22b and a side face 22s. Also, the front cross member 12 has a hat-shaped cross section and has a flange portion 12f projecting forward in the vehicle. The lower face 22b of the plate member 22 is joined to an upper face of the flange portion 12f. Accordingly, the side face 22s of the plate member 22 is disposed away from a side face 12s of the front cross member 12, forward in the vehicle. Also, the side face 22s of the plate member 22 faces the side face 12s of the front cross member 12, and is disposed extending in the vehicle-width direction.

Thus, in the cross section (see FIG. 5) perpendicular to a longitudinal direction (vehicle-width direction) of the front cross member 12, a member making up the cross section can be added by the plate member 22. The cross-sectional shape can be made more complicated, and accordingly the moment of inertia of area of the front cross member 12 can be increased. As illustrated in FIG. 2, a region of presence E1 of the plate member 22 in the vehicle-width direction overlaps at least part of a region of presence E2 of the connecting member 13 in the vehicle-width direction. Accordingly, rigidity of the front cross member 12 in the region where the connecting member 13 is present can be increased by the plate member 22. Combining the bracket 21 and the plate member 22 enables improvement of rigidity of the connecting portion by the connecting member 13 while maintaining space conservation.

Structure of Flange 17

One flange 17 is disposed at each distal end of the side rails 11 in the vehicle-forward direction. A bumper reinforcement (omitted from illustration) is attached to the flange 17 via a crash box (omitted from illustration). Also, an end portion 17e of the flange 17 inward in the vehicle-width direction is connected to the bracket 21.

With this structure, an annular structure can be formed by the side rail 11, the flange 17, the bracket 21, the front cross member 12, and the connecting member 13. Rigidity of the connecting portion can be increased by the connecting member 13.

Effects

In some embodiments, depending on the layout of various types of parts in a front compartment, the front cross member 12 may be situated on a downward side of the side rails 11. However, the front cross member 12 functions as a reinforcing member that connects the side rails 11 together. Accordingly, when the front cross member 12 is positioned on the downward side of the side rails 11, there is a possibility that rigidity of the suspension member 10 may deteriorate. Accordingly, in the technology according to the present specification, the front cross structure is divided into a member extending in the vehicle-width direction (front cross member 12), and a member connected to the side rail 11 (connecting member 13). The connecting members 13 are joined to the sides of the side rails, and also the upper face of the front cross member 12 is joined to lower faces of the connecting members 13. This enables the front cross member 12 to be situated on the downward side from the side rails 11. Thus, the connecting member 13 has a closed cross-sectional structure formed by the upper plate 13U, the lower plate 13L, and the side plates 13S. The front cross member 12 can be connected to the side rails 11 via the closed cross-sectional structure, and accordingly, sufficient rigidity can be ensured at the connecting portion between the two. The position of the front cross member 12 can be lowered with respect to the side rails 11, while keeping rigidity of the suspension member 10 from deteriorating. As a result, structures in a motor room can be arranged further downward, enabling design in which the center of gravity of the vehicle is lower, and the hood position is lower. Also, a vehicle with a smaller motor room and a shorter overhang can be realized, and accordingly increase in the size of the vehicle can be suppressed.

Figure 6:
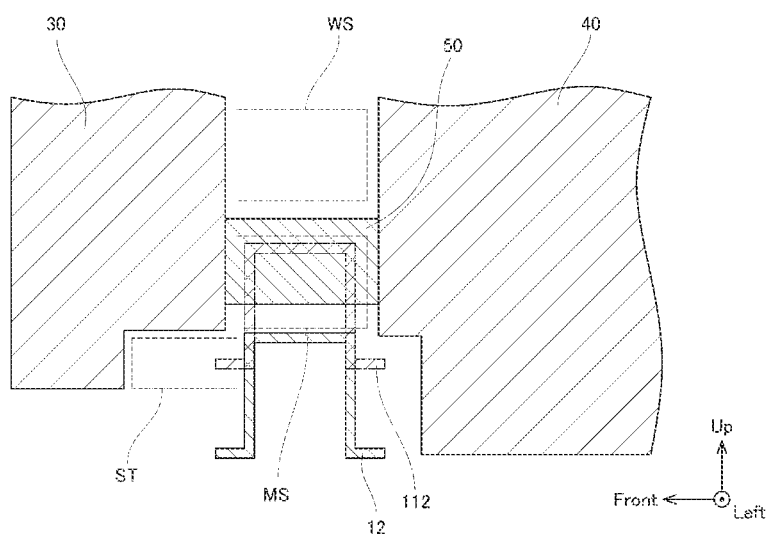
FIG. 6 is a schematic cross-sectional view taken along line VI-VI in FIG. 3.

FIG. 6 is a schematic cross-sectional view taken along line VI-VI in FIG. 3. FIG. 6 is a cross-sectional view in which the radiator 30, the motor unit 40, and a pipe 50 are installed. The pipe 50 connects the radiator 30 and the motor unit 40. Also, a cross section of a front cross member 112 in a conventional structure is indicated by long dashed short dashed lines, and a cross section of the front cross member 12 according to the present embodiment is indicated by continuous lines. In comparison with the conventional front cross member 112, the position of the front cross member 12 according to the present embodiment can be shifted downward in the vehicle up-down direction. Thus, an installation space MS for the pipe 50 can be formed, and accordingly the installation positions of the radiator 30, the motor unit 40, and the pipe 50 can be lowered. This enables the center of gravity of the vehicle to be lowered, and the size of the motor room to be reduced. Also, by lowering the installation positions of such equipment, workspace WS necessary for inspection and replacement work can be secured. Also, interference between the front cross member 12 and the radiator 30 can be averted, and accordingly a stroke ST for averting light collision damage can be secured.

As a comparative example, a case will be considered in which the height of the front cross member 12 is made lower than the height of the side rails 11, without providing the connecting member 13. In this state, when the motor mount 41 is disposed on the side rail 11, the motor mount 41 needs to be supported by the upper face 11t of the side rail 11 alone. This makes the supporting area of the motor mount 41 small. On the other hand, the technology according to the present embodiment enables the connecting member 13 to function as a member for supporting the motor mount 41 as well. The motor mount 41 can be supported by the upper face 11t of the side rail 11 and the second region R2, and accordingly the supporting area of the motor mount 41 can be expanded. Thus, the motor unit 40 can be stably fixed.

Although a specific example of the technology disclosed in the present specification is described in detail above, this is only exemplary and is not intended to limit the scope of the claims. The technology described in the claims includes various modifications and alterations of the specific example exemplified above. The technical elements described in the present specification or illustrated in the drawings exhibit technical utility solely or in various combinations, and are not limited to the combinations described in the claims at the time of filing. The technology exemplified in the present specification or in the drawings may achieve a plurality of objects at the same time, and has technical utility in itself by achieving one of the objects.

Modification

The vehicle structure according to the present embodiment is not limited to an electrified vehicle using an electric motor as a prime mover, and can also be suitably adopted to a vehicle that has an engine. Note that the term "electrified vehicle" here includes, for example, a rechargeable battery electric vehicle charged by an external power source, a fuel cell electric vehicle that uses a fuel cell as a power source, a hybrid electric vehicle that also has an engine, and so forth.

The motor mount 41 is an example of a prime mover mount.

What is claimed is:

1. A vehicle comprising:
   a body; and
   a suspension member that is attached to a lower portion of the body, at a vehicle-front side,
   the suspension member including
     a pair of side rails extending in a front-rear direction of the vehicle,
     a front cross member disposed between the side rails, and extending in a vehicle-width direction, and
     a pair of connecting members that connects the front cross member and the side rails,
     each of the connecting members including
       an upper plate that is joined to an upper face of the side rail and that projects from the side rail inward in the vehicle-width direction,
       a lower plate that is joined to a lower face of the side rail and that projects from the side rail inward in the vehicle-width direction, and a side plate that connects the upper plate and the lower plate that project from the side rail, wherein the lower plate and an upper face of the front cross member are joined together.

2. The vehicle according to claim 1, further comprising a bracket that projects forward in the vehicle from the front cross member and that is configured to be able to support a radiator, the bracket including a plate member that is distanced from the front cross member and faces the front cross member, and also extends in the vehicle-width direction, wherein a region of presence of the plate member in the vehicle-width direction overlaps at least part of a region of presence of the connecting member in the vehicle-width direction.

3. The vehicle according to claim 2, further comprising a flange disposed at a distal end of the side rail in a vehicle-forward direction, wherein the flange is connected to the bracket.

4. The vehicle according to claim 1, wherein the upper plate includes a first region situated above the side rail and a second region projecting inward in the vehicle-width direction from the side rail, and a prime mover mount disposed across the first region and the second region.

5. The vehicle according to claim 4, wherein the prime mover mount is fastened to the side rail along with the upper plate.

* * * * *